G. W. JACQUES.
STARTING AND STOPPING MECHANISM.
APPLICATION FILED MAR. 27, 1916.

1,261,544.

Patented Apr. 2, 1918.

INVENTOR
George W. Jacques
By his Attorney

UNITED STATES PATENT OFFICE.

GEORGE W. JACQUES, OF BRIDGEPORT, CONNECTICUT, ASSIGNOR, BY MESNE ASSIGNMENTS, TO UNITED SHOE MACHINERY CORPORATION, OF PATERSON, NEW JERSEY, A CORPORATION OF NEW JERSEY.

STARTING AND STOPPING MECHANISM.

1,261,544. Specification of Letters Patent. Patented Apr. 2, 1918.

Application filed March 27, 1916. Serial No. 87,010.

*To all whom it may concern:*

Be it known that I, GEORGE W. JACQUES, a citizen of the United States, residing at Bridgeport, in the county of Fairfield and State of Connecticut, have invented certain Improvements in Starting and Stopping Mechanisms, of which the following description, in connection with the accompanying drawings, is a specification, like reference characters on the drawings indicating like parts in the several figures.

This invention relates to starting and stopping mechanism of that type wherein a clutch under manual control is disengaged at a predetermined point in the cycle of operations of a machine so that the operating parts come to rest always in the same positions.

In the embodiment of the invention herein disclosed the clutch is shifted by a cam through interposed transmission devices. By interrupting effective connection through the transmission devices the clutch is permitted to move into its engaging position to start the machine and the machine continues to operate until the transmission devices are rendered operative so that, at the proper time in the cycle, the action of the clutch throwing cam may be transmitted to the clutch.

An object of the invention is to provide mechanism so constructed and arranged that the operator may cause the clutch to engage and the machine to be operated through one complete cycle or through a series of complete cycles as desired and then come to rest automatically in predetermined initial position.

To this end a feature of the invention consists in a movably mounted transmission piece or interponent member having one treadle rod directly connected thereto and a second treadle rod having a shiftable connection therewtih. As herein shown the interponent piece may be moved by the treadle directly connected to it and held while the machine continues to run, while the interponent piece may be moved only sufficiently to start the machine by the second treadle and then immediately returned to initial position and the machine stopped after the completion of a single cycle. Such mechanism facilitates the use of high speed machinery by rendering its control more accurate and reliable and by eliminating the danger of over-running.

While it is essential that the stopping of mechanism of the class in question should be positive in character, it is also important that it should be light in its tripping action, as otherwise the operator will be fatigued by the effort of repeatedly starting the machine. In this connection another feature of the invention consists in an interponent piece having a pivotally mounted striker arranged to act as a positive stop in the shifting movement of the piece but disengaging from its coöperating member by a rolling movement which requires a small amount of strength on the part of the operator.

These and other features of the invention will be best understood and appreciated from the following description of a preferred embodiment thereof selected for purposes of illustration and shown in the accompanying drawings, in which:—

Figure 1:
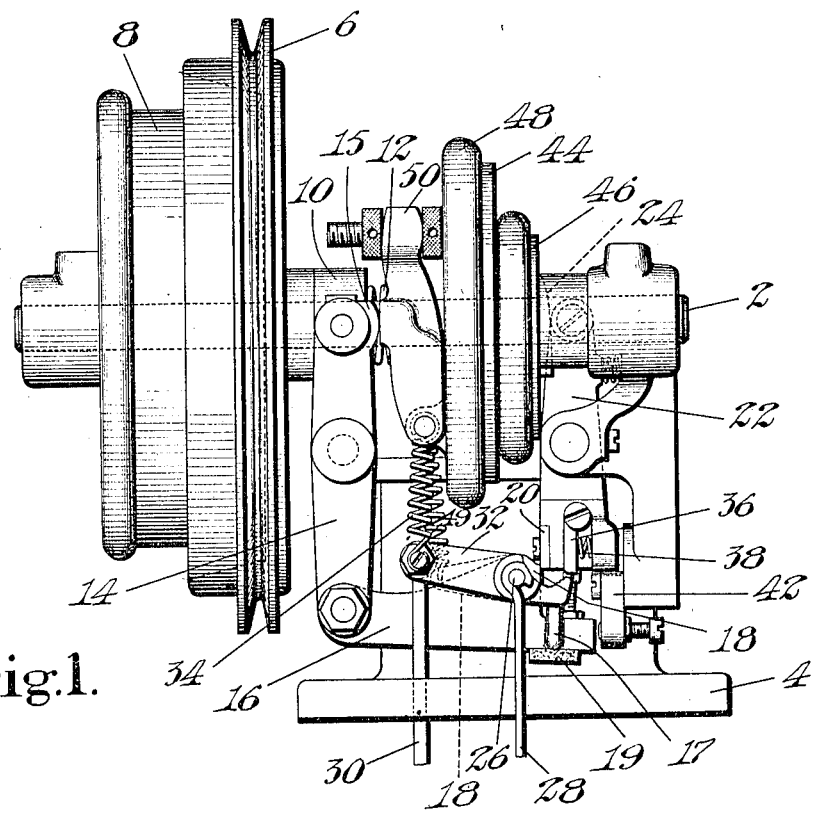
Figure 1 is a view in elevation of the mechanism in stopped position.
Figure 2:
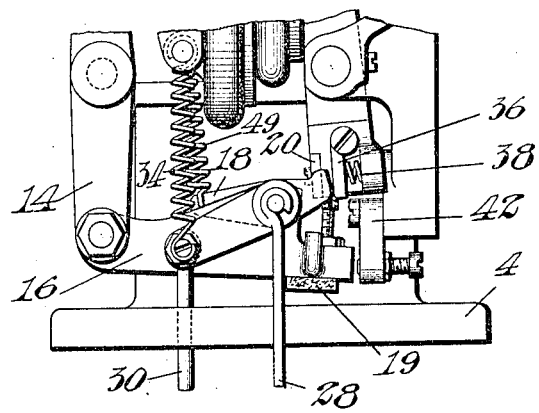
Fig. 2 is a similar view showing the position of the mechanism when the machine has been started for a single revolution.
Figure 3:
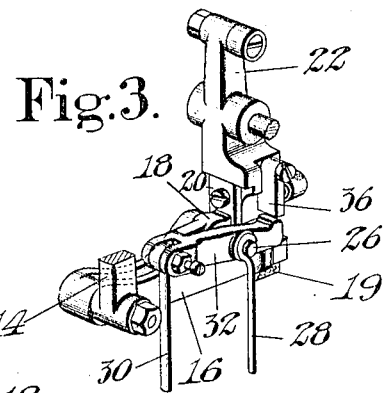
Fig. 3 is a view in perspective of the tripping mechanism.
Figure 4:
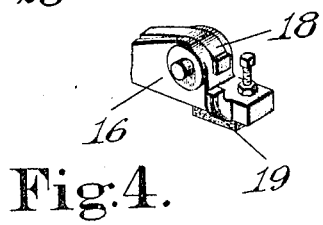
Fig. 4 is a detail view of a portion of the tripping mechanism.

The shaft 2 is suitably journaled in a frame 4 and provided with a loose pulley 6 which forms one member of the clutch and for this purpose is provided on one face with a concave recess. The other member 8 of the clutch is keyed to the shaft 2 and provided with a conical portion shaped to fit into the recess of the pulley 6. The hub of the pulley 6 runs against a sleeve 10. A compression spring 12 encircling the shaft 2 bears against the right hand end of the sleeve 10, normally forcing it and the loose pulley 6 toward the left and thus causing clutching engagement between the pulley 6 and the fast member 8 of the clutch.

The position of the sleeve 10 is controlled by a shifting lever 14 pivotally mounted upon the frame and forked to engage the sleeve. At its lower end lever 14 is pivotally connected to a transmission piece 16 carrying a pivoted striking piece 18 which is arranged to be engaged by a hardened block 20 secured to the lower end of a cam lever 22 which is also pivotally mounted upon the frame 4 and arranged to be oscillated by a cam 24 on the shaft 2.

The action of the spring 12 is opposed in moving the shifting lever 14 to disengage the clutch by the cam 24 through the connections above discussed, and it will be seen that when the upper end of the cam lever 22 is swung to the right by the cam 24 the sleeve 10 will be moved to the right permitting the pulley 6 to be displaced sufficiently to disengage it from the member 8.

The clutch is permitted to engage when the operator swings the interponent piece 16 downwardly to carry the striking piece 18 out of engagement with the block or abutment 20 on the cam lever 22. This may be effected by either of two treadle rods 28 or 30 according as it is desired to operate the machine through a number of cycles or through a single cycle. The treadle rod 28 is directly connected to a stud 26 projecting from the base 16 and by depressing this treadle rod the piece 16 may be lowered and held in such position as long as it is desired to operate the machine. When the treadle rod 28 is released the spring 49 immediately returns it to its upper or elevated position and in the ensuing oscillation of the cam lever 22 the collar 10 is shifted and the clutch disengaged.

A short treadle lever 32 is journaled upon a stud 26 and connected at its rear end to a treadle rod 30. A spring 34 acts in oppositon to the treadle rod and holds the treadle lever 32 normally in engagement with a stop lug 17 on the piece 16. The right hand end of the treadle lever 32 engages the lower end of an abutment 36 pivotally mounted upon the cam lever 22 and extending downwardly from its pivot. A spring 38 normally holds the abutment 36 in its left hand position but permits it to yield toward the right as will presently appear. When the treadle rod 30 is depressed the treadle lever 32 will fulcrum upon the abutment 36 and force the piece 16 downwardly disengaging the striker 18 from block 20 as before permitting the clutch to be engaged. The turning movement of the treadle lever 32 and the downward movement of the piece 16 cause the end of the treadle lever to slip toward the left off from the end of the abutment 36 and, as soon as this happens, the piece 16 is moved upwardly by the spring 49 and the end of the treadle lever is carried past the abutment 36 while the latter yields toward the right against the compression of the spring 38. The result is therefore a momentary depression of the piece 16 which permits the clutch to engage for a single revolution, but in the oscillation of the cam lever immediately ensuing, again disengages the clutch.

Movement is imparted to the piece 16 by the cam lever 22 through the engagement of the hardened block on the cam lever with the pivoted striker 18 on the piece 16. This striker 18 is pivotally mounted upon the stud 26 and is held normally by a spring 49 with its right hand end in lowermost position. When the piece 16 is depressed through either of the treadles, the striker 18 rocks about its axis and is disengaged from the block 20 by a rolling action. The advantage of this construction is that the pressure required to lower the piece 16 and trip the clutch is appreciably reduced, while, at the same time, the operative engagement between the striker and the block 20 which is effective in disengaging the clutch is of a positive character.

Any suitable driving mechanism may be mounted upon the shaft 2. In the present drawings the starting and stopping mechanism is illustrated as applied to a machine for setting eyelets or the like and to this end the shaft carries an eccentric 46 which operates the setting instrumentalities through suitable connecting mechanism. Adjacent to the eccentric 46 is a brake disk 44 partially surrounded by a brake shoe 48. Pivotally mounted upon the left hand side of the brake shoe is a lever 50 having projections arranged in the path of laterally projecting ears 15 on the shifting lever 14. When the shifting lever 14 is moved toward the right at its upper end to disengage the clutch the brake shoe 48 through the lever 50 is forced toward the right against the brake disk 44 and the mechanism thus promptly brought to rest.

The interponent piece 16 is suspended above the base of the frame 4 and carries at its right hand end an adjustable stop screw which limits its upward movement by engaging a flat surface on the lower end of the cam lever 22. The piece 16 also carries a yielding abutment 19 which engages the frame when the piece is depressed and so limits its downward movement. A pivoted locking device 42 is arranged on the frame in position to engage the right hand end of the piece 16 and hold it with the clutch disengaged in case it should be desired to turn over the mechanism by hand without the action of the starting and stopping mechanism.

Having thus described my invention, I claim as new and desire to secure by Letters Patent.

1. Starting and stopping mechanism having, in combination, a movable clutch member, a clutch thrower, and connecting devices including a movably mounted interponent piece, a treadle rod directly connected to said piece, and a second treadle rod having a shiftable connection with said piece.

2. Starting and stopping mechanism having, in combination, a movable clutch member, a clutch thrower, and connecting devices including a movable interponent piece, a treadle rod for moving and holding said piece, and a second treadle rod for moving said piece, so connected thereto as to permit the immediate return of said piece to initial position.

3. Starting and stopping mechanism having, in combination, a movable clutch member, a clutch thrower, and connecting devices including a movable interponent piece, a lever pivoted upon said piece, an abutment arranged to engage one end of the lever, and a treadle rod connected to the other end of the lever.

4. Starting and stopping mechanism having, in combination, a movable clutch member, a clutch thrower, and connecting devices including a horizontally disposed interponent piece, an abutment with which said piece is engaged when the clutch is disengaged, a lever pivoted upon said piece, a treadle rod connected to the lever for disengaging said piece from its abutment and permitting its return to initial position, and a second treadle rod for disengaging and holding said piece.

5. Starting and stopping mechanism having, in combination, a clutch shifting arm, a cam arm having a fixed abutment and a yielding abutment, an interponent piece having a treadle lever for engaging the movable abutment, and a pivoted striking piece for engaging the fixed abutment.

6. Starting and stopping mechanism having, in combination, a clutch shifting arm, a cam arm having a pivoted abutment arranged to yield horizontally, an interposed piece having a pivoted treadle lever arranged to engage the lower end of the pivoted abutment and, by co-action therewith, to move said piece downwardly, said abutment thereafter yielding to permit the treadle lever to pass upwardly beyond it.

7. Starting and stopping mechanism having, in combination, a clutch shifting arm, a cam arm having a rigid abutment, an interposed piece having a pivoted striker, and means for normally holding the striker in position to engage the abutment but permitting the striker to swing while the piece is being moved to disengage the striker from the abutment.

8. Starting and stopping mechanism having, in combination, a clutch shifting arm, a cam arm having a rigid abutment and a yielding abutment, and a connecting piece having a striker and a treadle lever pivoted upon the same axis, the treadle lever being arranged to engage its abutment and displace the connecting piece while the striker rolls off its abutment.

In testimony whereof I have signed my name to this specification.

GEORGE W. JACQUES.

Copies of this patent may be obtained for five cents each, by addressing the "Commissioner of Patents. Washington, D. C."